(12) United States Patent
Kim et al.

(10) Patent No.: US 10,650,279 B1
(45) Date of Patent: May 12, 2020

(54) LEARNING METHOD AND LEARNING DEVICE FOR HETEROGENEOUS SENSOR FUSION BY USING MERGING NETWORK WHICH LEARNS NON-MAXIMUM SUPPRESSION

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/724,301

(22) Filed: Dec. 22, 2019

Related U.S. Application Data

(60) Provisional application No. 62/799,097, filed on Jan. 31, 2019.

(51) Int. Cl.
*G06K 9/00* (2006.01)
*G06K 9/62* (2006.01)
(Continued)

(52) U.S. Cl.
CPC ........... *G06K 9/6256* (2013.01); *G06F 17/18* (2013.01); *G06K 9/00805* (2013.01);
(Continued)

(58) Field of Classification Search
CPC ............. G06K 9/6256; G06K 9/00805; G06K 9/3233; G06K 9/6212; G06F 17/18; G06N 3/04; G06N 3/0635
See application file for complete search history.

(56) References Cited

U.S. PATENT DOCUMENTS

| | | | |
|---|---|---|---|
| 10,095,917 B2 * | 10/2018 | Taigman | G06K 9/00295 |
| 2019/0384291 A1 * | 12/2019 | Michalakis | G06N 20/00 |
| 2020/0025877 A1 * | 1/2020 | Sarkis | G01S 7/417 |

* cited by examiner

*Primary Examiner* — Shefali D Goradia
(74) *Attorney, Agent, or Firm* — Xsensus LLP

(57) ABSTRACT

A learning method for generating integrated object detection information of an integrated image by integrating first object detection information and second object detection information is provided. The method includes steps of: (a) a learning device, if the first object detection information and the second object detection information is acquired, instructing a concatenating network included in a DNN to generate pair feature vectors including information on pairs of first original ROIs and second original ROIs; (b) the learning device instructing a determining network included in the DNN to apply FC operations to the pair feature vectors, to thereby generate (i) determination vectors and (ii) box regression vectors; (c) the learning device instructing a loss unit to generate an integrated loss, and performing backpropagation processes by using the integrated loss, to thereby learn at least part of parameters included in the DNN.

22 Claims, 4 Drawing Sheets

(51) Int. Cl.
*G06F 17/18* (2006.01)
*G06N 3/04* (2006.01)
*G06N 3/063* (2006.01)
*G06K 9/32* (2006.01)

(52) U.S. Cl.
CPC ......... *G06K 9/3233* (2013.01); *G06K 9/6212* (2013.01); *G06N 3/04* (2013.01); *G06N 3/0635* (2013.01)

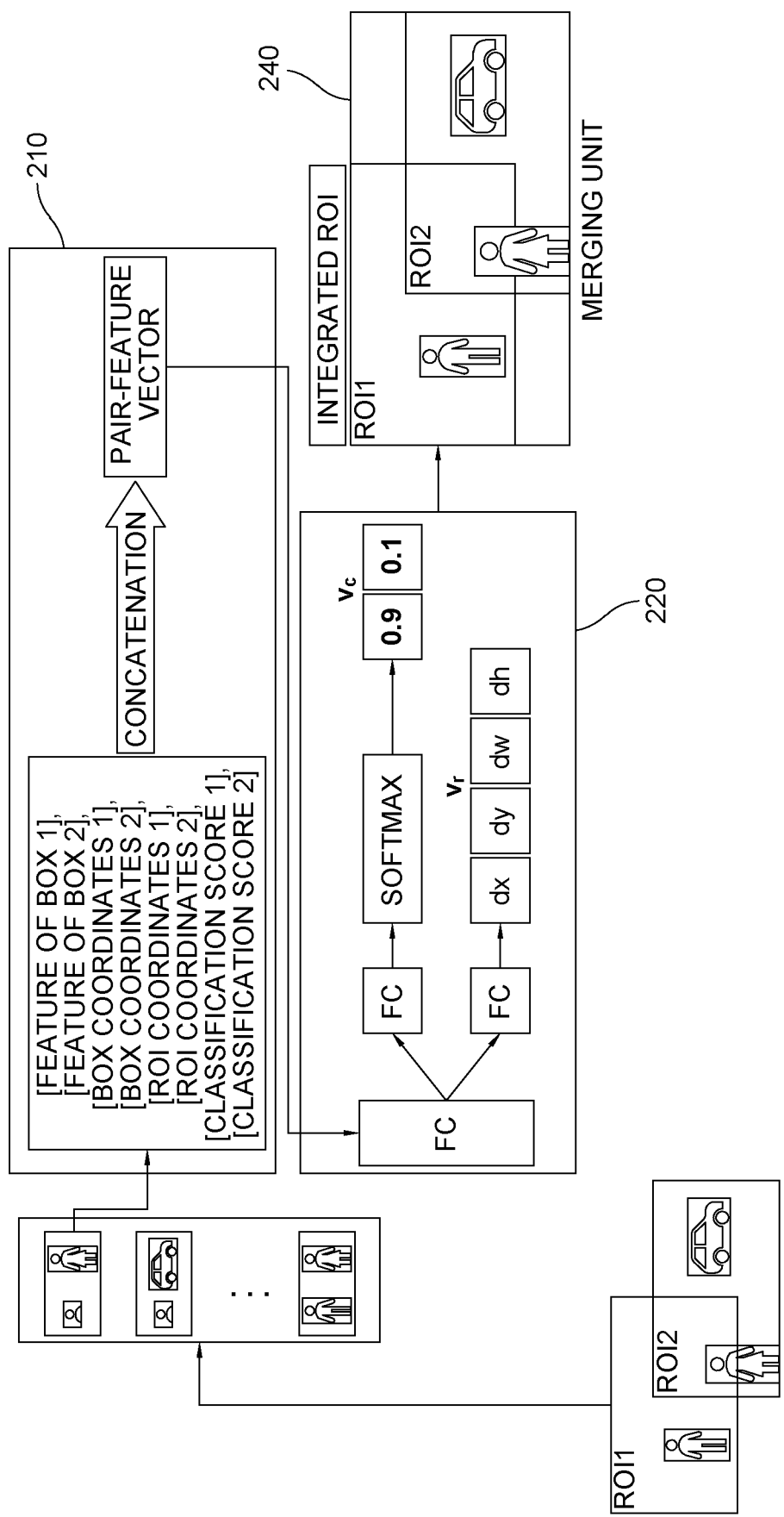

LEARNING METHOD AND LEARNING DEVICE FOR HETEROGENEOUS SENSOR FUSION BY USING MERGING NETWORK WHICH LEARNS NON-MAXIMUM SUPPRESSION

CROSS REFERENCE OF RELATED APPLICATION

This present application claims the benefit of the earlier filing date of provisional patent application No. 62/799,097, filed Jan. 31, 2019, the entire contents of which being incorporated herein by reference.

FIELD OF THE DISCLOSURE

The present disclosure relates to a learning method and a learning device for use with an autonomous vehicle; and more particularly, to the method and the device for a heterogeneous sensor fusion by using a merging network, and a testing method and a testing device using the same.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These CNNs have won the 2012 ImageNet image classification tournament, crushing other competitors. Then, the convolutional neural network became a very useful tool in the field of the machine learning.

Such CNNs are also used in a field of autonomous driving. The CNNs are responsible for image processing such as semantic segmentation, object detection, and free space detection in autonomous vehicles.

Recently, a plurality of cameras has been used in order to further improve a stability of the autonomous vehicles. Herein, it is important to use the images in a coordinated way which are obtained through the plurality of cameras in order to reduce a redundancy of computation and to grasp surrounding space more clearly. Particularly, during the coordination of the images, parts of ROIs, which are areas in which objects are estimated as located in each image, often overlap with one another among different images. Therefore it is crucial to integrate information on such ROIs.

As a conventional technique for such a purpose, a non-maximal suppression is used. That is, an overlapping ratio between bounding boxes including objects of a same class is calculated, and if the ratio is equal to or greater than a threshold, the bounding boxes are combined with each other. The problem with the conventional technique is that if the threshold is too low, the bounding boxes that are not related to one another will be merged, and if the threshold is too high, the bounding boxes to be merged will not be integrated with one another, thus it is difficult to determine the threshold, and the threshold must be constantly updated as the case may be.

SUMMARY OF THE DISCLOSURE

It is an object of the present disclosure to solve all the aforementioned problems.

It is another object of the present disclosure to generate integrated object detection information of an integrated image by integrating each piece of object detection information of each of original images while reducing redundancy of computation of detecting objects in the integrated image, to thereby generate the integrated image with more detailed and accurate information on a surrounding space, when generating the integrated image of a specific space by integrating each of the original images of the specific space.

In accordance with one aspect of the present disclosure, there is provided a learning method for generating integrated object detection information of at least one integrated image by integrating first object detection information and second object detection information each corresponding to a first original image and a second original image on a specific space, to be used for generating the integrated image, without extra computation on the integrated image, including steps of: (a) a learning device, if the first object detection information and the second object detection information are acquired by processing the first original image and the second original image, instructing a concatenating network included in a DNN to generate one or more pair feature vectors including information on one or more pairs of first original ROIs included in the first original image and second original ROIs in the second original image; (b) the learning device instructing a determining network included in the DNN to apply one or more FC operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative locations of integrated ROIs, corresponding to at least part of the pairs, comparing to each of original locations of each component of said at least part of the pairs, on the integrated image; (c) the learning device instructing a loss unit to generate an integrated loss by referring to the determination vectors, the box regression vectors and their corresponding GTs, and performing backpropagation processes by using the integrated loss, to thereby learn at least part of parameters included in the DNN.

As one example, at the step of (a), a specific pair feature vector, which is one of the pair feature vectors, includes (i) first class information of a first specific object included in the first original image, (ii) feature values of a first specific original ROI including the first specific object, (iii) coordinate values of a first specific original bounding box corresponding to the first specific original ROI, (iv) coordinate values of the first specific original ROI, (v) second class information of a second specific object included in the second original image, (vi) feature values of a second specific original ROI including the second specific object, (vii) coordinate values of a second specific original bounding box corresponding to the second specific original ROI, and (viii) coordinate values of the second specific original ROI.

As one example, at the step of (b), a specific determination vector, which is one of the determination vectors and corresponds to the specific pair feature vector, includes information on a probability of the first specific original ROI and the second specific original ROI being integrated on the integrated image, and a specific box regression vector, which is one of the box regression vectors and corresponds to the specific pair feature vector, includes information on coordinates of a specific integrated bounding box generated by merging the first specific original ROI and the second specific original ROI on the integrated image.

As one example, at the step of (c), the learning device instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

As one example, at the step of (c), the determination loss is generated by a formula below:

$$L_c = \frac{1}{n}\sum_{i=1}^{n} \langle v_c^i, \log(v_{C-GT}^i)\rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} \text{smooth}_{L1}(v_r^i, v_{R-GT}^i)$$

$$\text{where smooth}_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C-GT}^i$ denotes an i-th box regression GT vector on the i-th box regression vector.

As one example, the learning device instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

As one example, at the step of (b), the learning device instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

In accordance with another aspect of the present disclosure, there is provided testing method for generating integrated object detection information for testing of at least one integrated image for testing by integrating first object detection information for testing and second object detection information for testing each corresponding to a first original image for testing and a second original image for testing on a specific space for testing, to be used for generating the integrated image for testing, without extra computation on the integrated image for testing, including steps of: (a) on condition that (1) a learning device, if first object detection information for training and second object detection information for training have been acquired by processing first original image for training and the second original image for training, has instructed a concatenating network included in a DNN to generate one or more pair feature vectors for training including information on one or more pairs for training of first original ROIs for training included in the first original image for training and second original ROIs for training in the second original image for training; (2) the learning device has instructed a determining network included in the DNN to apply one or more FC operations to the pair feature vectors for training, to thereby generate (i) one or more determination vectors for training including information on probabilities of the first original ROIs for training and the second original ROIs for training included in each of the pairs for training being appropriate to be integrated and (ii) one or more box regression vectors for training including information on each of relative locations of integrated ROIs for training, corresponding to at least part of the pairs for training, comparing to each of original locations of each component of said at least part of the pairs for training, on the integrated image for training; (3) the learning device has instructed a loss unit to generate an integrated loss by referring to the determination vectors for training, the box regression vectors for training and their corresponding GTs, and performing backpropagation processes by using the integrated loss, to thereby learn at least part of parameters included in the DNN, a testing device, if the first object detection information for testing and the second object detection information for testing are acquired by processing the first original image for testing and the second original image for testing, instructing the concatenating network included in the DNN to generate one or more pair feature vectors for testing including information on one or more pairs for testing of first original ROIs for testing included in the first original image for testing and second original ROIs for testing in the second original image for testing; (b) the testing device instructing the determining network included in the DNN to apply one or more FC operations to the pair feature vectors for testing, to thereby generate (i) one or more determination vectors for testing including information on probabilities of the first original ROIs for testing and the second original ROIs for testing included in each of the pairs for testing being appropriate to be integrated and (ii) one or more box regression vectors for testing including information on each of relative locations of integrated ROIs for testing, corresponding to at least part of the pairs for testing, comparing to each of original locations of each component of said at least part of the pairs for testing, on the integrated image for testing; and (c) the testing device instructing a merging unit to generate the integrated object detection information for testing by merging at least part of the pairs for testing of first original bounding boxes for testing and second original bounding boxes for testing by referring to the determination vectors for testing and the box regression vectors for testing.

As one example, the first object detection information for testing and the second object detection information for testing are acquired from the first original image for testing and the second original image for testing, each acquired through a first camera for a first direction and a second camera for a second direction installed on a vehicle including the test device.

As one example, at the step of (a), a specific pair feature vector for testing, which is one of the pair feature vectors for testing, includes (i) first class information for testing of a first specific object for testing included in the first original image for testing, (ii) feature values for testing of a first specific original ROI for testing including the first specific object for testing, (iii) coordinate values of a first specific original bounding box for testing corresponding to the first specific original ROI for testing, (iv) coordinate values of the first specific original ROI for testing, (v) second class information for testing of a second specific object for testing included in the second original image for testing, (vi) feature values for testing of a second specific original ROI for testing including the second specific object for testing, (vii) coordinate values of a second specific original bounding box for testing corresponding to the second specific original ROI for testing and (viii) coordinate values of the second specific original ROI for testing.

As one example, at the step of (b), a specific determination vector for testing, which is one of the determination vectors for testing and corresponds to the specific pair feature vector for testing, includes information on a probability of the first specific original ROI for testing and the second specific original ROI for testing being integrated on the integrated image for testing, and a specific box regression vector for testing, which is one of the box regression vectors for testing and corresponds to the specific pair feature vector for testing, includes information on coordinates of a specific integrated bounding box for testing generated by merging the first specific original ROI for testing and the second specific original ROI for testing on the integrated image for testing.

In accordance with still another aspect of the present disclosure, there is provided learning device for generating integrated object detection information of at least one integrated image by integrating first object detection information and second object detection information each corresponding to a first original image and a second original image on a specific space, to be used for generating the integrated image, without extra computation on the integrated image, including: at least one memory that stores instructions; and at least one processor configured to execute the instructions to perform processes of: (I) if the first object detection information and the second object detection information is acquired by processing the first original image and the second original image, instructing a concatenating network included in a DNN to generate one or more pair feature vectors including information on one or more pairs of first original ROIs included in the first original image and second original ROIs in the second original image; (II) instructing a determining network included in the DNN to apply one or more FC operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative locations of integrated ROIs, corresponding to at least part of the pairs, comparing to each of original locations of each component of said at least part of the pairs, on the integrated image; (III) instructing a loss unit to generate an integrated loss by referring to the determination vectors, the box regression vectors and their corresponding GTs, and performing backpropagation processes by using the integrated loss, to thereby learn at least part of parameters included in the DNN.

As one example, at the process of (I), a specific pair feature vector, which is one of the pair feature vectors, includes (i) first class information of a first specific object included in the first original image, (ii) feature values of a first specific original ROI including the first specific object, (iii) coordinate values of a first specific original bounding box corresponding to the first specific original ROI, (iv) coordinate values of the first specific original ROI, (v) second class information of a second specific object included in the second original image, (vi) feature values of a second specific original ROI including the second specific object, (vii) coordinate values of a second specific original bounding box corresponding to the second specific original ROI, and (viii) coordinate values of the second specific original ROI.

As one example, at the process of (II), a specific determination vector, which is one of the determination vectors and corresponds to the specific pair feature vector, includes information on a probability of the first specific original ROI and the second specific original ROI being integrated on the integrated image, and a specific box regression vector, which is one of the box regression vectors and corresponds to the specific pair feature vector, includes information on coordinates of a specific integrated bounding box generated by merging the first specific original ROI and the second specific original ROI on the integrated image.

As one example, at the process of (III), the processor instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

As one example, at the process of (III), the determination loss is generated by a formula below:

$$L_c = \frac{1}{n}\sum_{i=1}^{n} \langle v_c^i, \log(v_{C\text{-}GT}^i) \rangle$$

wherein n denotes the number of the determination vectors, $v_c^i$ denotes an i-th determination vector, $v_{C\text{-}GT}^i$ denotes an i-th determination GT vector on the i-th determination vector, and the box regression loss is generated by a formula below:

$$L_r = \frac{1}{n}\sum_{i=1}^{n} \text{smooth}_{L1}(v_r^i, v_{R\text{-}GT}^i)$$

$$\text{where smooth}_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C\text{-}GT}^i$ denotes an i-th box regression GT vector on the i-th box regression vector.

As one example, the processor instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

As one example, at the process of (II), the processor instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

In accordance with still yet another aspect of the present disclosure, there is provided a test device for generating integrated object detection information for testing of at least one integrated image for testing by integrating first object detection information for testing and second object detection information for testing each corresponding to a first original image for testing and a second original image for testing on a specific space for testing, to be used for generating the integrated image for testing, without extra computation on the integrated image for testing, including: at least one memory that stores instructions; and at least one processor configured to execute instructions to perform processes of: (I) on condition that (1) a processor, if first object detection information for training and second object detection information for training have been acquired by processing first original image for training and the second original image for training, has instructed a concatenating network included in a DNN to generate one or more pair feature vectors for training including information on one or more pairs for training of first original ROIs for training included in the first original image for training and second original ROIs for training in the second original image for training; (2) the processor has instructed a determining network included in the DNN to apply one or more FC operations to the pair feature vectors for training, to thereby generate (i) one or more determination vectors for training including information on probabilities of the first original ROIs for training and the second original ROIs for training included in each of the pairs for training being appropriate to be integrated and (ii) one or more box regression vectors for training including information on each of relative locations of integrated ROIs for training, corresponding to at least part of the pairs for training, comparing to each of original locations of each component of said at least part of the pairs for training, on the integrated image for training; (3) the processor has instructed a loss unit to generate an integrated loss by referring to the determination vectors for training, the box regression vectors for training and their corresponding GTs, and performing backpropagation processes by using the integrated loss, to thereby learn at least part of parameters included in the DNN, if the first object detection information for testing and the second object detection information for testing are acquired by processing the first original image for testing and the second original image for testing, instructing the concatenating network included in the DNN to generate one or more pair feature vectors for testing including information on one or more pairs for testing of first original ROIs for testing included in the first original image for testing and second original ROIs for testing in the second original image for testing; (II) instructing the determining network included in the DNN to apply one or more FC operations to the pair feature vectors for testing, to thereby generate (i) one or more determination vectors for testing including information on probabilities of the first original ROIs for testing and the second original ROIs for testing included in each of the pairs for testing being appropriate to be integrated and (ii) one or more box regression vectors for testing including information on each of relative locations of integrated ROIs for testing, corresponding to at least part of the pairs for testing, comparing to each of original locations of each component of said at least part of the pairs for testing, on the integrated image for testing; and (III) instructing a merging unit to generate the integrated object detection information for testing by merging at least part of the pairs for testing of first original bounding boxes for testing and second original bounding boxes for testing by referring to the determination vectors for testing and the box regression vectors for testing.

As one example, the first object detection information for testing and the second object detection information for testing are acquired from the first original image for testing and the second original image for testing, each acquired through a first camera for a first direction and a second camera for a second direction installed on a vehicle including the test device.

As one example, at the process of (I), a specific pair feature vector for testing, which is one of the pair feature vectors for testing, includes (i) first class information for testing of a first specific object for testing included in the first original image for testing, (ii) feature values for testing of a first specific original ROI for testing including the first specific object for testing, (iii) coordinate values of a first specific original bounding box for testing corresponding to the first specific original ROI for testing, (iv) coordinate values of the first specific original ROI for testing, (v) second class information for testing of a second specific object for testing included in the second original image for testing, (vi) feature values for testing of a second specific original ROI for testing including the second specific object for testing, (vii) coordinate values of a second specific original bounding box for testing corresponding to the second specific original ROI for testing and (viii) coordinate values of the second specific original ROI for testing.

As one example, at the process of (II), a specific determination vector for testing, which is one of the determination vectors for testing and corresponds to the specific pair feature vector for testing, includes information on a probability of the first specific original ROI for testing and the second specific original ROI for testing being integrated on the integrated image for testing, and a specific box regression vector for testing, which is one of the box regression vectors for testing and corresponds to the specific pair feature vector for testing, includes information on coordinates of a specific integrated bounding box for testing generated by merging the first specific original ROI for testing and the second specific original ROI for testing on the integrated image for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 4 is a drawing schematically illustrating a detailed operation of a testing device on condition that the learning method for generating the integrated object detection information of the integrated image by additionally integrating each piece of the object detection information of each of the original images without extra computation on the integrated image has been completed in accordance with one example embodiment of the present disclosure.

DETAILED DESCRIPTION OF THE PREFERRED EMBODIMENTS

Figure 1:
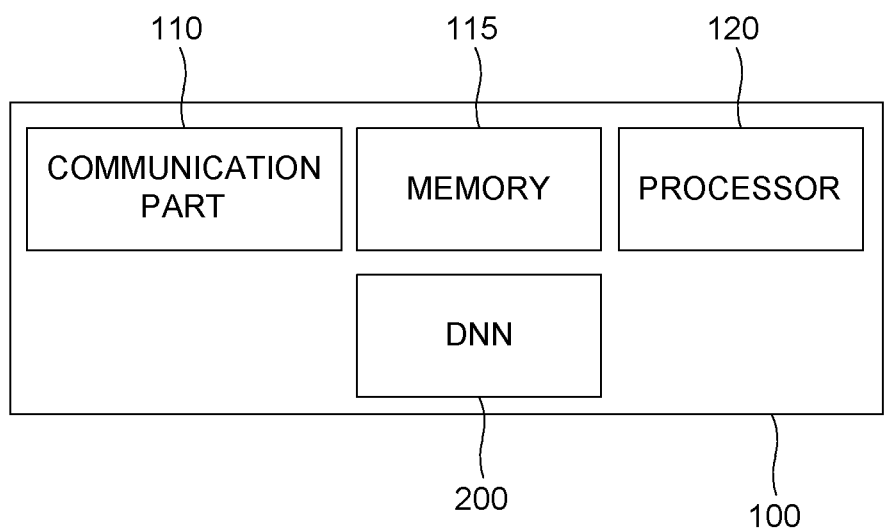
FIG. 1 is a drawing schematically illustrating a learning device performing a learning method for generating integrated object detection information of an integrated image by integrating each piece of object detection information of each of original images without extra computation on the integrated image when generating the integrated image of a specific space by integrating each of the original images of the specific space in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a learning device 100 performing a learning method for generating integrated object detection information of an integrated image by integrating each piece of object detection information of each of original images without extra computation on the integrated image when generating the integrated image of a specific space by integrating each of the original images of the specific space in accordance with one example embodiment of the present disclosure.

By referring to FIG. 1, the learning device 100 may include a DNN 200, to be described in detail later. Processes of input/output and computations of the DNN 200 may be respectively performed by a communication part 110 and a processor 120. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

Figure 2:
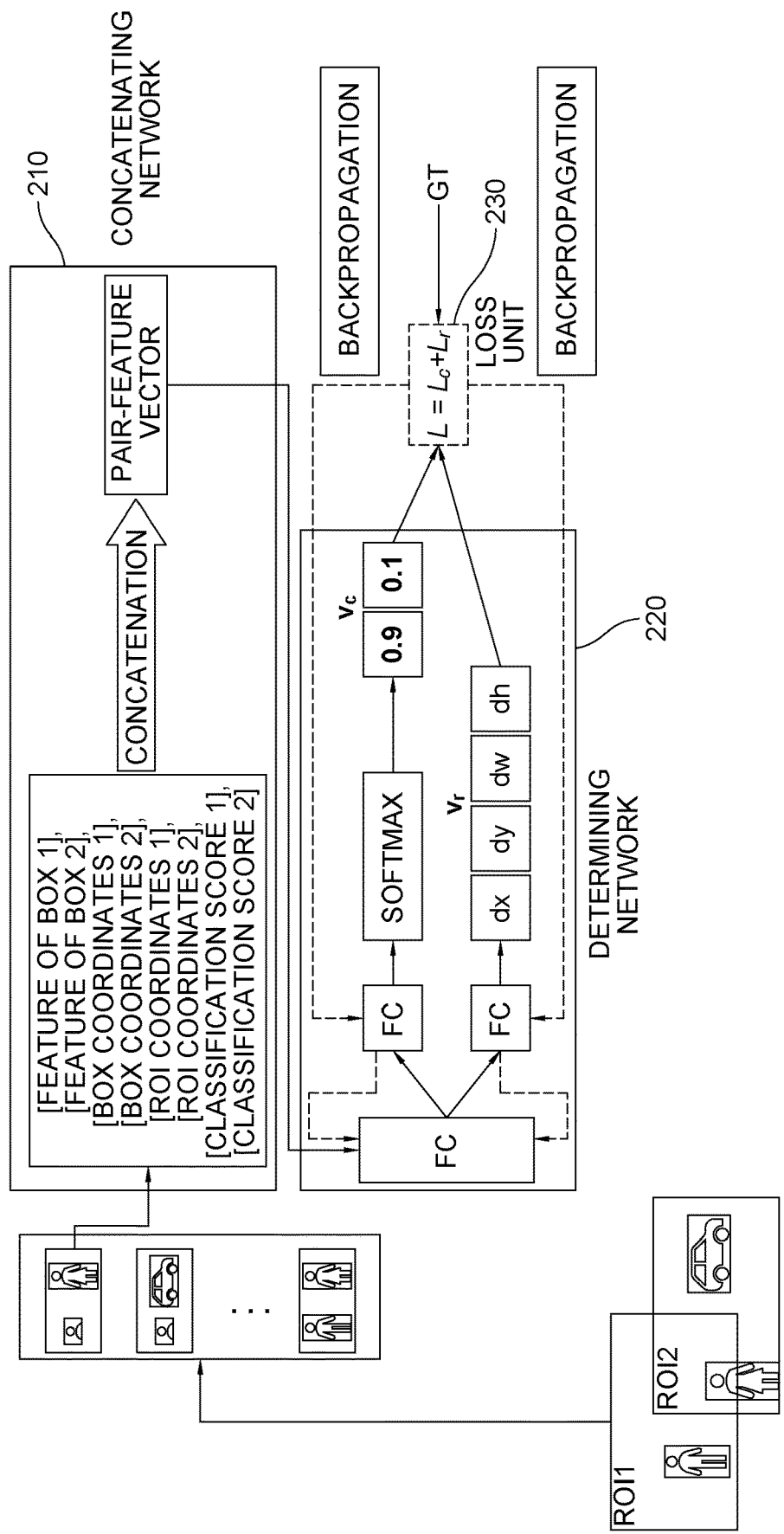
FIG. 2 is a drawing schematically illustrating a detailed operation of the learning device performing the learning method for generating the integrated object detection information of the integrated image by integrating each piece of the object detection information of each of the original images without extra computation on the integrated image when generating the integrated image of the specific space by integrating each of the original images of the specific space in accordance with one example embodiment of the present disclosure.

The above description shows a configuration of the learning device 100 performing the learning method for generating the integrated object detection information of the integrated image by integrating each piece of the object detection information of each of the original images without extra computation on the integrated image when generating the integrated image of the specific space by integrating each of the original images of the specific space in accordance with one example embodiment of the present disclosure, and by referring to FIG. 2, a detailed configuration and learning processes of the DNN 200 are described below.

FIG. 2 is a drawing schematically illustrating a detailed operation of the learning device 100 performing the learning method for generating the integrated object detection information of the integrated image by integrating each piece of the object detection information of each of the original images without extra computation on the integrated image when generating the integrated image of the specific space by integrating each of the original images of the specific space in accordance with one example embodiment of the present disclosure.

By referring to FIG. 2, the DNN 200 may include a concatenating network 210 and a determining network 220, and the learning device 100 may include a loss unit 230 corresponding to the DNN 200. Specifically, if each piece of the object detection information of each of the original images of the specific space is acquired, the learning device 100 may transmit said each piece of the object detection information to the concatenating network 210 in the DNN 200. Herein, said each piece of the object detection information may include information on each of ROIs in each of the original images, each of objects in each of the ROIs and its corresponding original bounding box. Additionally, each of the original images of the specific space may be each of images of the specific space taken from various perspective at a same point of time. Therefore, each of contents of each of the original images may be same or similar to one another, and each of original ROIs for each of the original images may also include same or similar regions.

If the object detection information is acquired as such, the concatenating network 210 may pair at least part of each of the original bounding boxes included in the original ROIs, to thereby generate one or more so-called pair feature vectors. As one example, the concatenating network 210 may integrate a first specific original bounding box and a second specific original bounding box, each included in a first original ROI and a second original ROI, to thereby generate a specific pair feature vector among the pair feature vectors including (i) feature values of the first original bounding box, (ii) coordinate information of the first original bounding box, and (iii) first class information on an object in the first original bounding box, (iv) feature values of the second original bounding box, (v) coordinate information of the second original bounding box, and (vi) second class information on an object in the second original bounding box, (vii) coordinates of the first specific original ROI, and (viii) coordinates of the second specific original ROI. Herein, first object detection information on a first original image may include (i), (ii), (iii) and (vii), and second object detection information may include (iv), (v), (vi), and (viii). The first specific original ROI may include one or more first original bounding boxes, the second specific original ROI may include one or more second original bounding boxes, and each of first original bounding boxes in the first specific original ROI and each of second original bounding boxes in the second specific original ROI may be paired once, to thereby generate each of the pair feature vectors.

Such first original ROI including the first specific original bounding box may be included in a first original image, which is one of the original images. Similarly, the second original ROI including the second specific original bounding box may be included in a second original image.

By referring to FIG. 3, an example of the specific pair feature vector is described in detail as below.

Figure 3:
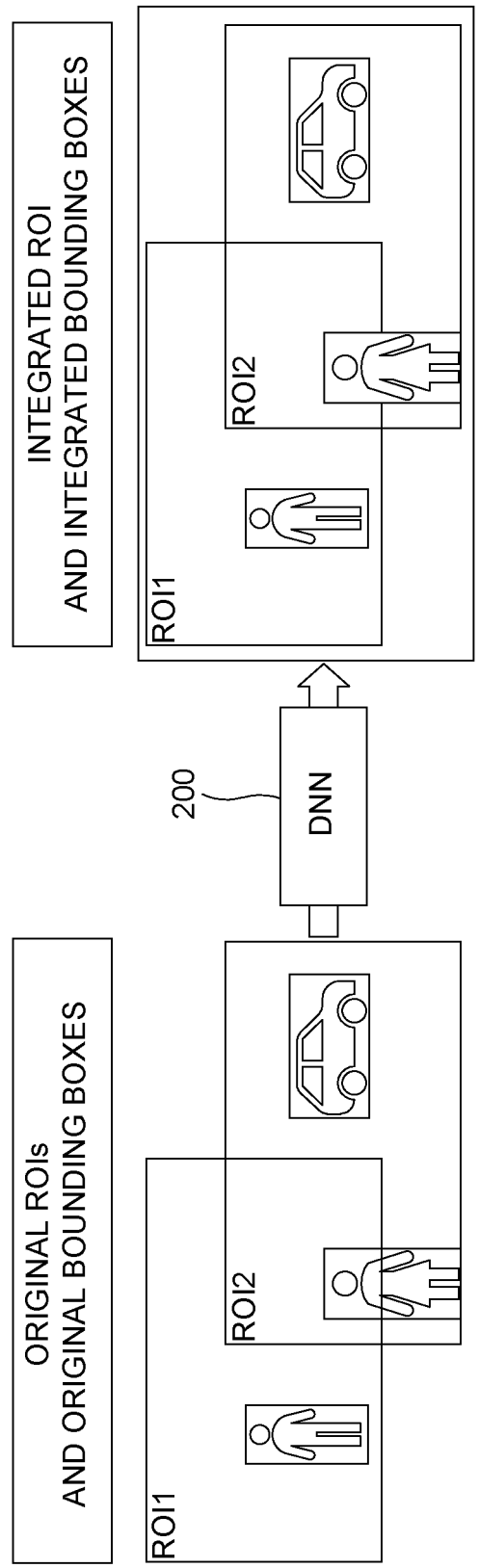
FIG. 3 is a drawing schematically illustrating an example of integrating a first specific original ROI and a second specific original ROI through the learning method for generating the integrated object detection information of the integrated image by integrating each piece of the object detection information of each of the original images without extra computation on the integrated image when generating the integrated image of the specific space by integrating each of the original images of the specific space in accordance with one example embodiment of the present disclosure.

FIG. 3 is a drawing schematically illustrating an example of integrating a first specific original ROI and a second specific original ROI through the learning method for generating the integrated object detection information of the integrated image by integrating each piece of the object detection information of each of the original images without extra computation on the integrated image when generating the integrated image of the specific space by integrating each of the original images of the specific space in accordance with one example embodiment of the present disclosure.

The first specific original ROI may include one of the first bounding boxes containing a male and another one of the first bounding boxes containing an upper body of a female, and the second specific original ROI may include one of the second bounding boxes containing the female and another one of the second bounding boxes containing a vehicle. Herein, a total of four bounding box pairs may be generated, for example, (i) said one of the first bounding boxes containing the upper body of the female with said one of the second bounding boxes containing the female, (ii) said one of the first bounding boxes containing the upper body of the female with said another one of the second bounding boxes containing the vehicle, (iii) said another one of the first bounding boxes containing the male with said one of the second bounding boxes containing the female, and (iv) said another one of the first bounding boxes containing the male with said another one of the second bounding boxes containing the vehicle. As one example, the specific pair feature vector generated by using the pair of said one of the first bounding boxes containing the upper body of the female with said one of the second bounding boxes containing the female may include aforementioned information on those bounding boxes.

If the pair feature vectors are generated as such, the learning device 100 may instruct the determining network 220 in the DNN 200 to generate one or more determination vectors $v_C$ and one or more box regression vectors $v_r$ by at least one FC operation. Herein, one of the determination vectors $v_C$ may represent whether the two original bounding boxes can be integrated, each of which is included in two original ROIs as a pair, and as one example, its first component may be a probability of the two original bounding boxes being integrated, and its second component may be a probability of the two original bounding boxes not being integrated. Herein, the determining network 220 may calculate each probability of each component. By referring to FIG. 2 again, the probability of the pair corresponding to the specific pair feature vector being integrated may be calculated as 0.9. One of the box regression vectors $v_r$ may have, as its components, values of changes corresponding to changes of coordinates of vertices according to integration of the two original bounding boxes. Specifically, the values of changes in one of the box regression vectors may correspond to information on respective differences between (I) (i) a horizontal length, (ii) a vertical length, and (iii) x and y coordinates of a center, of an intersection of the two original bounding boxes, and (II) (i) a horizontal length, (ii) a vertical length, and (iii) x and y coordinates of a center, of an integrated bounding box into which the two original bounding boxes are integrated. That is, the box regression vectors may include information on each of relative locations of integrated ROIs corresponding to at least part of the pairs, comparing to original locations of each component of said at least of the pairs, on the integrated image.

In one embodiment, the box regression vectors may not correspond to all of the pair feature vectors. That is, those can be generated by selecting some of the pair feature vectors and applying at least part of the FC operations to the selected pair feature vectors. Such embodiment will be explained later in detail.

If the determination vectors and the box regression vectors are generated as such, the learning device 100 may instruct the loss unit 230 to calculate one or more losses by referring to the determination vectors, the box regression vectors, and their corresponding GTs. The losses may include two components $L_c$ and $L_r$, where the $L_c$ may be a determination loss related to the determination vectors and may be calculated by using a cross entropy, and the $L_r$ may be a box regression loss related to the box regression vectors and may be calculated by using a smooth L1 loss.

More specifically, the determination loss may be generated by a formula below:

$$L_c = \frac{1}{n}\sum_{i=1}^{n} \langle v_c^i, \log(v_{C-GT}^i) \rangle$$

Herein, n denotes the number of the determination vectors, $v_c^i$ denotes an i-th determination vector among the determination vectors, $v_{C\text{-}GT}^i$ denotes an i-th determination GT vector on the i-th determination vector.

And, the box regression loss may be generated by a formula below:

$$L_r = \frac{1}{n}\sum_{i=1}^{n} \text{smooth}_{L1}(v_r^i, v_{R\text{-}GT}^i)$$

$$\text{where smooth}_{L1}(x, y) = \begin{cases} 0.5|x-y|^2, & \text{if } |x-y| < 1 \\ |x-y| - 0.5, & \text{otherwise} \end{cases}$$

Herein n denotes the number of the box regression vectors, $v_c^i$ denotes an i-th box regression vector, $v_{C\text{-}GT}^i$ denotes an i-th box regression GT vector on the i-th box regression vector.

After the losses are generated, such losses may be back-propagated to be used for learning at least part of one or more parameters of the determining network 220 in the DNN 200. As a result, the determining network 220 determines more accurately whether its inputted bounding boxes can be integrated, and predicts more accurately the information on the vertices after the integration.

As an additional embodiment of the present invention, the learning device 100 may instruct the determining network 220 included in the DNN 200 to generate the determination vectors by applying at least part of the FC operations to the pair feature vectors, and to generate the one or more box regression vectors corresponding to one or more specific pair feature vectors among the pair feature vectors whose corresponding values in corresponding specific determination vectors denoting specific probabilities of corresponding specific pairs to be integrated are larger than a prescribed threshold. This embodiment can be efficient because it does not calculate the coordinates of pairs whose probabilities of being integrated are smaller than the threshold.

Herein, how the DNN 200 works will be explained below. the learning device 100 instructs each of deep learning neurons included in one or more layers of the DNN 200 to repeatedly apply one or more convolutional operations to its input by using its own at least one parameter and deliver its output to its next deep learning neuron, to thereby generate the pair feature vectors, the determination vectors and the box regression vectors.

After completion of the learning processes above, the learning device 100 of the present disclosure may function as a testing device as described below by referring to FIG. 4.

For reference, in the description below, the phrase "for training" or "training" is added for terms related to the learning processes, and the phrase "for testing" or "testing" is added for terms related to testing processes, to avoid possible confusion.

FIG. 4 is a drawing schematically illustrating a detailed operation of the testing device on condition that the learning method for generating integrated ROI information by additionally integrating each of the original ROIs of each of the original images has been completed in accordance with one example embodiment of the present disclosure.

By referring to FIG. 4, the testing device may include a merging unit instead of the loss unit 230. If a probability, included in at least one determination vector for testing, of two original bounding boxes for testing to be integrated is equal to or greater than a certain threshold, the merging unit may calculate coordinates of vertices of an integrated bounding box for testing into which the two original bounding boxes for testing are integrated by using values of changes for testing in at least one box regression vector for testing. Each of the pairs of the original ROIs may be integrated by repeating such operations on pair feature vectors for testing of the pairs of the original ROIs, and thereafter, the operations may be applied to every original ROI, to thereby integrate the original images, and thus results of object detection on the integrated image may be generated without additional operations on the integrated image. Functions of other components like the concatenating network 210 and the determining network 220 are similar to their functions when performing in the learning device 100 and thus omitted.

Specifically, (a) on condition that (1) the learning device 100, if first object detection information for training and second object detection information for training have been acquired by processing first original image for training and the second original image for training, has instructed the concatenating network 210 included in the DNN 200 to generate one or more pair feature vectors for training including information on one or more pairs of first original ROIs for training included in the first original image for training and second original ROIs for training in the second original image for training; (2) the learning device 100 has instructed the determining network 220 included in the DNN 200 to apply one or more FC operations to the pair feature vectors for training, to thereby generate (i) one or more determination vectors for training including information on probabilities of the first original ROIs for training and the second original ROIs for training included in each of the pairs being appropriate to be integrated and (ii) one or more box regression vectors for training including information on each of relative locations of integrated ROIs for training, corresponding to at least part of the pairs for training, comparing to each of original locations of each component of said at least part of the pairs, on the integrated image for training; (3) the learning device 100 has instructed the loss unit 230 to generate an integrated loss by referring to the determination vectors for training, the box regression vectors for training and their corresponding GTs, and performing back-propagation processes by using the integrated loss, to thereby learn at least part of parameters included in the DNN 200, a testing device, if the first object detection information for testing and the second object detection information for testing are acquired by processing the first original image for testing and the second original image for testing, may instruct the concatenating network 210 included in the DNN 200 to generate one or more pair feature vectors for testing including information on one or more pairs of first original ROIs for testing included in the first original image for testing and second original ROIs for testing in the second original image for testing.

After, the testing device may instruct the determining network included in the DNN 200 to apply one or more FC operations to the pair feature vectors for testing, to thereby generate (i) one or more determination vectors for testing including information on probabilities of the first original ROIs for testing and the second original ROIs for testing included in each of the pairs being appropriate to be integrated and (ii) one or more box regression vectors for testing including information on each of relative locations of integrated ROIs for testing, corresponding to at least part of the pairs, comparing to each of original locations of each component of said at least part of the pairs, on the integrated image for testing.

Finally the testing device may instruct the merging unit 240 to generate the integrated object detection information for testing by merging at least part of the pairs of the first original bounding boxes for testing and the second original bounding boxes for testing by referring to the determination vectors for testing and the box regression vectors for testing.

Herein, the first object detection information for testing and the second object detection information for testing are acquired from the first original image for testing and the second original image for testing, each acquired through a first camera for a first direction and a second camera for a second direction installed on a vehicle including the test device.

As such, the DNN 200 of the present disclosure can be called as a merging network, since the DNN 200 merges different pieces of object detection information.

The present disclosure directs to a method of heterogeneous sensor fusion. Specifically, it provides a method for integrating ROIs generated by referring to information acquired by several cameras on an integrated ROI space. By performing the present disclosure, object detection results can be integrated to one data set, which may help a computing power consumption to be reduced.

The present disclosure has an effect of generating the integrated object detection information of the integrated image by integrating each piece of the object detection information of each of the original images and reducing redundancy of computation of detecting the objects in the integrated image, to thereby generate the integrated image with more detailed and accurate information on a surrounding space, when generating the integrated image of the specific space by integrating each of the original images of the specific space.

As can be understood by those skilled in the art, it is clear that communication parts of the learning device 100 and the testing device may perform transmission of image data, for example, images described above like the original image, original labels, and additional labels, etc., and that processors and/or memories of the learning device 100 and the testing device may retain data for feature maps and performing operations, and that the processors of the learning device 100 and the testing device may perform convolution operations, deconvolution operations, and loss value operations, but the scope of the present disclosure is not limited thereto.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for generating integrated object detection information of at least one integrated image by integrating first object detection information and second object detection information each corresponding to a first original image and a second original image on a specific space, to be used for generating the integrated image, without extra computation on the integrated image, comprising steps of:
   (a) a learning device, if the first object detection information and the second object detection information are acquired by processing the first original image and the second original image, instructing a concatenating network included in a Deep Neural Network (DNN) to generate one or more pair feature vectors including information on one or more pairs of first original Region of Interests (ROIs) included in the first original image and second original ROIs in the second original image;
   (b) the learning device instructing a determining network included in the DNN to apply one or more Fully-Connected (FC) operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative locations of integrated ROIs, corresponding to at least part of the pairs, comparing to each of original locations of each component of said at least part of the pairs, on the integrated image;
   (c) the learning device instructing a loss unit to generate an integrated loss by referring to the determination vectors, the box regression vectors and their corresponding (GTs), and performing backpropagation processes by using the integrated loss, to thereby learn at least part of parameters included in the DNN.

2. The method of claim 1, wherein, at the step of (a), a specific pair feature vector, which is one of the pair feature vectors, includes (i) first class information of a first specific object included in the first original image, (ii) feature values of a first specific original ROI including the first specific object, (iii) coordinate values of a first specific original bounding box corresponding to the first specific original ROI, (iv) coordinate values of the first specific original ROI, (v) second class information of a second specific object included in the second original image, (vi) feature values of a second specific original ROI including the second specific object, (vii) coordinate values of a second specific original bounding box corresponding to the second specific original ROI, and (viii) coordinate values of the second specific original ROI.

3. The method of claim 2, wherein, at the step of (b), a specific determination vector, which is one of the determination vectors and corresponds to the specific pair feature vector, includes information on a probability of the first specific original ROI and the second specific original ROI being integrated on the integrated image, and a specific box regression vector, which is one of the box regression vectors and corresponds to the specific pair feature vector, includes information on coordinates of a specific integrated bounding box generated by merging the first specific original ROI and the second specific original ROI on the integrated image.

4. The method of claim 1, wherein, at the step of (c), the learning device instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

5. The method of claim 4, wherein, at the step of (c), the determination loss is generated by a formula below:

$$L_c = \frac{1}{n}\sum_{i=1}^{n} \langle v_c^i, \log(v_{C-GT}^i) \rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} \text{smooth}_{L1}(v_r^i, v_{R-GT}^i)$$

$$\text{where smooth}_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C-GT}^i$ denotes an i-th box regression GT vector on the i-th box regression vector.

6. The method of claim 1, wherein the learning device instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

7. The method of claim 1, wherein, at the step of (b), the learning device instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

8. A testing method for generating integrated object detection information for testing of at least one integrated image for testing by integrating first object detection information for testing and second object detection information for testing each corresponding to a first original image for testing and a second original image for testing on a specific space for testing, to be used for generating the integrated image for testing, without extra computation on the integrated image for testing, comprising steps of:

(a) on condition that (1) a learning device, if first object detection information for training and second object detection information for training have been acquired by processing first original image for training and the second original image for training, has instructed a concatenating network included in a DNN to generate one or more pair feature vectors for training including information on one or more pairs for training of first original Region of Interests (ROIs) for training included in the first original image for training and second original ROIs for training in the second original image for training; (2) the learning device has instructed a determining network included in the Deep Neural Network (DNN) to apply one or more Fully-connected (FC) operations to the pair feature vectors for training, to thereby generate (i) one or more determination vectors for training including information on probabilities of the first original ROIs for training and the second original ROIs for training included in each of the pairs for training being appropriate to be integrated and (ii) one or more box regression vectors for training including information on each of relative locations of integrated ROIs for training, corresponding to at least part of the pairs for training, comparing to each of original locations of each component of said at least part of the pairs for training, on the integrated image for training; (3) the learning device has instructed a loss unit to generate an integrated loss by referring to the determination vectors for training, the box regression vectors for training and their corresponding (GTs), and performing backpropagation processes by using the integrated loss, to thereby learn at least part of parameters included in the DNN, a testing device, if the first object detection information for testing and the second object detection information for testing are acquired by processing the first original image for testing and the second original image for testing, instructing the concatenating network included in the DNN to generate one or more pair feature vectors for testing including information on one or more pairs for testing of first original ROIs for testing included in the first original image for testing and second original ROIs for testing in the second original image for testing;

(b) the testing device instructing the determining network included in the DNN to apply one or more FC operations to the pair feature vectors for testing, to thereby generate (i) one or more determination vectors for testing including information on probabilities of the first original ROIs for testing and the second original ROIs for testing included in each of the pairs for testing being appropriate to be integrated and (ii) one or more box regression vectors for testing including information on each of relative locations of integrated ROIs for testing, corresponding to at least part of the pairs for testing, comparing to each of original locations of each component of said at least part of the pairs for testing, on the integrated image for testing; and (c) the testing device instructing a merging unit to generate the integrated object detection information for testing by merging at least part of the pairs for testing of first original bounding boxes for testing and second original bounding boxes for testing by referring to the determination vectors for testing and the box regression vectors for testing.

9. The method of claim 8, wherein the first object detection information for testing and the second object detection information for testing are acquired from the first original image for testing and the second original image for testing, each acquired through a first camera for a first direction and a second camera for a second direction installed on a vehicle including the test device.

10. The method of claim 8, wherein, at the step of (a), a specific pair feature vector for testing, which is one of the pair feature vectors for testing, includes (i) first class information for testing of a first specific object for testing included in the first original image for testing, (ii) feature values for testing of a first specific original ROI for testing including the first specific object for testing, (iii) coordinate values of a first specific original bounding box for testing corresponding to the first specific original ROI for testing, (iv) coordinate values of the first specific original ROI for testing, (v) second class information for testing of a second specific object for testing included in the second original image for testing, (vi) feature values for testing of a second specific original ROI for testing including the second specific object for testing, (vii) coordinate values of a second specific original bounding box for testing corresponding to the second specific original ROI for testing and (viii) coordinate values of the second specific original ROI for testing.

11. The method of claim 10, wherein, at the step of (b), a specific determination vector for testing, which is one of the determination vectors for testing and corresponds to the specific pair feature vector for testing, includes information on a probability of the first specific original ROI for testing and the second specific original ROI for testing being integrated on the integrated image for testing, and a specific box regression vector for testing, which is one of the box regression vectors for testing and corresponds to the specific pair feature vector for testing, includes information on coordinates of a specific integrated bounding box for testing generated by merging the first specific original ROI for testing and the second specific original ROI for testing on the integrated image for testing.

12. A learning device for generating integrated object detection information of at least one integrated image by integrating first object detection information and second object detection information each corresponding to a first original image and a second original image on a specific space, to be used for generating the integrated image, without extra computation on the integrated image, comprising:
    at least one memory that stores instructions; and
    at least one processor configured to execute the instructions to perform processes of: (I) if the first object detection information and the second object detection information are acquired by processing the first original image and the second original image, instructing a concatenating network included in a Deep Neural Network (DNN) to generate one or more pair feature vectors including information on one or more pairs of first original Region of Interest (ROIs) included in the first original image and second original ROIs in the second original image; (II) instructing a determining network included in the DNN to apply one or more Fully-connected (FC) operations to the pair feature vectors, to thereby generate (i) one or more determination vectors including information on probabilities of the first original ROIs and the second original ROIs included in each of the pairs being appropriate to be integrated and (ii) one or more box regression vectors including information on each of relative locations of integrated ROIs, corresponding to at least part of the pairs, comparing to each of original locations of each component of said at least part of the pairs, on the integrated image; (III) instructing a loss unit to generate an integrated loss by referring to the determination vectors, the box regression vectors and their corresponding (GTs), and performing backpropagation processes by using the integrated loss, to thereby learn at least part of parameters included in the DNN.

13. The learning device of claim 12, wherein, at the process of (I), a specific pair feature vector, which is one of the pair feature vectors, includes (i) first class information of a first specific object included in the first original image, (ii) feature values of a first specific original ROI including the first specific object, (iii) coordinate values of a first specific original bounding box corresponding to the first specific original ROI, (iv) coordinate values of the first specific original ROI, (v) second class information of a second specific object included in the second original image, (vi) feature values of a second specific original ROI including the second specific object, (vii) coordinate values of a second specific original bounding box corresponding to the second specific original ROI, and (viii) coordinate values of the second specific original ROI.

14. The learning device of claim 13, wherein, at the process of (II), a specific determination vector, which is one of the determination vectors and corresponds to the specific pair feature vector, includes information on a probability of the first specific original ROI and the second specific original ROI being integrated on the integrated image, and a specific box regression vector, which is one of the box regression vectors and corresponds to the specific pair feature vector, includes information on coordinates of a specific integrated bounding box generated by merging the first specific original ROI and the second specific original ROI on the integrated image.

15. The learning device of claim 12, wherein, at the process of (III), the processor instructs the loss unit (i) to generate a determination loss by using at least part of the determination vectors through a cross entropy method, (ii) to generate a box regression loss by using at least part of the box regression vectors through a smooth-L1 method, and (iii) to generate the integrated loss by referring to the determination loss and the box regression loss.

16. The learning device of claim 15, wherein, at the process of (III), the determination loss is generated by a formula below:

$$L_c = \frac{1}{n}\sum_{i=1}^{n} \langle v_c^i, \log(v_{C-GT}^i) \rangle$$

wherein n denotes the number of the determination vectors, $v_c^i$ denotes an i-th determination vector, $v_{C-GT}^i$ denotes an i-th determination GT vector on the i-th determination vector, and the box regression loss is generated by a formula below:

$$L_r = \frac{1}{n}\sum_{i=1}^{n} \text{smooth}_{L1}(v_r^i, v_{R-GT}^i)$$

-continued $$\text{where smooth}_{L1}(x, y) = \begin{cases} 0.5|x-y|^2, & \text{if } |x-y| < 1 \\ |x-y| - 0.5, & \text{otherwise} \end{cases}$$

wherein n denotes the number of the box regression vectors, $v_c^i$ denotes an i-th box regression vector, $v_{C\text{-}GT}^i$ denotes an i-th box regression GT vector on the i-th box regression vector.

17. The learning device of claim 12, wherein the processor instructs each of deep learning neurons included in one or more layers of the DNN to repeatedly apply one or more convolutional operations to its input by using its own at least one parameter and deliver its output to its next deep learning neuron, to thereby generate the pair feature vectors, the determination vectors and the box regression vectors.

18. The learning device of claim 12, wherein, at the process of (II), the processor instructs the determining network included in the DNN to generate the determination vectors by applying at least part of the FC operations to the pair feature vectors, and to generate the one or more box regression vectors corresponding to one or more specific pair feature vectors, among the pair feature vectors, whose values in corresponding specific determination vectors denoting specific probabilities of specific pairs to be integrated are larger than a prescribed threshold, by applying the other part of the FC operations to the specific pair feature vectors.

19. A test device for generating integrated object detection information for testing of at least one integrated image for testing by integrating first object detection information for testing and second object detection information for testing each corresponding to a first original image for testing and a second original image for testing on a specific space for testing, to be used for generating the integrated image for testing, without extra computation on the integrated image for testing, comprising:

at least one memory that stores instructions; and at least one processor configured to execute instructions to perform processes of: (I) on condition that (1) a learning device, if first object detection information for training and second object detection information for training have been acquired by processing first original image for training and the second original image for training, has instructed a concatenating network included in a Deep Neural Network (DNN) to generate one or more pair feature vectors for training including information on one or more pairs for training of first original Region of Interests (ROIs) for training included in the first original image for training and second original ROIs for training in the second original image for training; (2) the learning device has instructed a determining network included in the DNN to apply one or more Fully-connected (FC) operations to the pair feature vectors for training, to thereby generate (i) one or more determination vectors for training including information on probabilities of the first original ROIs for training and the second original ROIs for training included in each of the pairs for training being appropriate to be integrated and (ii) one or more box regression vectors for training including information on each of relative locations of integrated ROIs for training, corresponding to at least part of the pairs for training, comparing to each of original locations of each component of said at least part of the pairs for training, on the integrated image for training; (3) the learning device has instructed a loss unit to generate an integrated loss by referring to the determination vectors for training, the box regression vectors for training and their corresponding (GTs), and performing backpropagation processes by using the integrated loss, to thereby learn at least part of parameters included in the DNN, a learning device, if the first object detection information for testing and the second object detection information for testing is acquired by processing the first original image for testing and the second original image for testing, instructing the concatenating network included in the DNN to generate one or more pair feature vectors for testing including information on one or more pairs for testing of first original ROIs for testing included in the first original image for testing and second original ROIs for testing in the second original image for testing; (II) instructing the determining network included in the DNN to apply one or more FC operations to the pair feature vectors for testing, to thereby generate (i) one or more determination vectors for testing including information on probabilities of the first original ROIs for testing and the second original ROIs for testing included in each of the pairs for testing being appropriate to be integrated and (ii) one or more box regression vectors for testing including information on each of relative locations of integrated ROIs for testing, corresponding to at least part of the pairs for testing, comparing to each of original locations of each component of said at least part of the pairs for testing, on the integrated image for testing; and (III) instructing a merging unit to generate the integrated object detection information for testing by merging at least part of the pairs for testing of first original bounding boxes for testing and second original bounding boxes for testing by referring to the determination vectors for testing and the box regression vectors for testing.

20. The test device of claim 19, wherein the first object detection information for testing and the second object detection information for testing are acquired from the first original image for testing and the second original image for testing, each acquired through a first camera for a first direction and a second camera for a second direction installed on a vehicle including the test device.

21. The test device of claim 19, wherein, at the process of (I), a specific pair feature vector for testing, which is one of the pair feature vectors for testing, includes (i) first class information for testing of a first specific object for testing included in the first original image for testing, (ii) feature values for testing of a first specific original ROI for testing including the first specific object for testing, (iii) coordinate values of a first specific original bounding box for testing corresponding to the first specific original ROI for testing, (iv) coordinate values of the first specific original ROI for testing, (v) second class information for testing of a second specific object for testing included in the second original image for testing, (vi) feature values for testing of a second specific original ROI for testing including the second specific object for testing, (vii) coordinate values of a second specific original bounding box for testing corresponding to the second specific original ROI for testing and (viii) coordinate values of the second specific original ROI for testing.

22. The test device of claim 21, wherein, at the process of (II), a specific determination vector for testing, which is one of the determination vectors for testing and corresponds to the specific pair feature vector for testing, includes information on a probability of the first specific original ROI for testing and the second specific original ROI for testing being integrated on the integrated image for testing, and a specific box regression vector for testing, which is one of the box regression vectors for testing and corresponds to the specific pair feature vector for testing, includes information on coordinates of a specific integrated bounding box for testing generated by merging the first specific original ROI for testing and the second specific original ROI for testing on the integrated image for testing.

* * * * *